(12) United States Patent
Wilkins

(10) Patent No.: US 6,231,764 B1
(45) Date of Patent: May 15, 2001

(54) SEPTIC TANK PUMP ARRANGEMENT INCLUDING A SELF-CLEANING ROTARY STRAINER

(75) Inventor: Charles A. Wilkins, Ann Arbor, MI (US)

(73) Assignee: Perfection Sprinkler Co., Ann Arbor, MI (US)

( * ) Notice: Subject to any disclaimer, the term of this patent is extended or adjusted under 35 U.S.C. 154(b) by 0 days.

(21) Appl. No.: 09/500,129

(22) Filed: Feb. 8, 2000

Related U.S. Application Data

(60) Provisional application No. 60/119,557, filed on Feb. 10, 1999, and provisional application No. 60/172,002, filed on Dec. 23, 1999.

(51) Int. Cl.[7] .......................... B01D 35/16; B01D 35/027
(52) U.S. Cl. ...................... 210/297; 210/393; 210/416.1; 210/532.2
(58) Field of Search ............................. 210/416.1, 532.2, 210/170, 359, 393, 394, 411, 460, 161, 236, 297

(56) References Cited

U.S. PATENT DOCUMENTS 3,443,696 * 5/1969 Schutte ................................ 210/297
5,215,656 * 6/1993 Stoneburner ......................... 210/170
5,492,635 * 2/1996 Ball ..................................... 210/802
5,531,894 * 7/1996 Ball et al. ............................ 210/605
5,635,064 * 6/1997 Bovington ........................... 210/338
5,690,824 * 11/1997 Stuth ................................. 210/532.2
5,904,847 * 5/1999 Bovington ......................... 210/532.2
5,985,139 * 11/1999 Zoeller ............................. 210/532.2

* cited by examiner

Primary Examiner—David A. Simmons
Assistant Examiner—Frank M. Lawrence
(74) Attorney, Agent, or Firm—George L. Boller

(57) ABSTRACT

A system for pumping effluent out of a septic tank contains an electric pump unit disposed coaxially within a tube. A rotary self-cleaning strainer has a cylindrical filter screen that filters certain solid material from the effluent flow through the tube upstream of the pump inlet port. Effluent is conveyed out of the septic tank through a pipe connected to the pump outlet port. A portion of the pumped effluent is conveyed to one or more nozzles arranged to wash the filter screen. In certain embodiments, the cylindrical screen is stationary and the nozzles rotate, while in other embodiments, the nozzles are stationary and the screen rotates. Depending on particular embodiment, the nozzles may be either inside or outside the screen. Effluent flow through the screen is opposite the direction of spray from the nozzles.

19 Claims, 11 Drawing Sheets

SEPTIC TANK PUMP ARRANGEMENT INCLUDING A SELF-CLEANING ROTARY STRAINER

REFERENCE TO APPLICATIONS AND PRIORITY CLAIM

This application expressly claims the benefit of earlier filing date and right of priority from the following patent applications: U.S. Provisional Application Ser. No. 60/119,557 filed on Feb. 10, 1999 in the name of Charles A. Wilkins and bearing the same title, and U.S. Provisional Application Ser. No. 60/172,002 filed on Dec. 23, 1999 in the name of Charles A. Wilkins and bearing the same title. The entirety each of those earlier-filed, co-pending patent applications is hereby expressly incorporated herein by reference.

FIELD OF THE INVENTION

This invention relates to systems for pumping effluent out of septic tanks.

BACKGROUND OF THE INVENTION

Certain wastes introduced into a septic tank tend to separate into distinct layers: a bottom sludge layer, a top scum layer, and a noticeably distinct intermediate liquid layer that is to a large extent free of scum and sludge. U.S. Pat. No. 5,531,894 describes a septic tank and a system for pumping effluent out of the tank. An electricmotor-operated effluent pump is disposed generally upright and coaxially within an upright main tube that extends downward from a top wall of the tank to a location at or near a bottom wall of the tank. Hence, the tube will pass through the top scum layer, through the intermediate liquid layer, and into the bottom sludge layer. Operation of the pump is controlled by sensors that sense the level of waste in the tank. When the level rises beyond an upper limit, the pump operates to pump fluid out of the tank until the level drops to a lower limit at which the pump shuts off.

Because of the nature of certain electric-motor-operated effluent pumps, it is important that liquid flows along the exterior of the pump/motor when the motor operates the pump so that heat generated by the electric motor is transferred to the liquid. Hence, a known electric-motor-operated pump for a septic tank comprises a tubular sleeve within which the pump and motor are coaxially disposed, and it is this sleeve that is disposed coaxially within the aforementioned upright main tube that extends downward from the top wall of the tank.

For various reasons, it is desirable to maintain the waste level within the tank between the upper and lower limits by pumping liquid from the intermediate zone, rather than drawing from either the sludge or scum layers. Accordingly, it is known to provide openings through the side wall of the main tube at the intermediate layer so that liquid from that layer can enter the main tube and pass downward through the main tube to the bottom of the pump/motor sleeve where it can then be drawn upward through the sleeve by operation of the pump. As the pump operates, liquid is drawn upward across the exterior of the electric motor that operates the pump and enters the pump inlet. The pump pumps the liquid out through an effluent pipe connected to the pump outlet, thereby conveying the effluent out of the tank. The liquid passing along the exterior of the motor serves to provide some cooling of the motor.

Because the intermediate layer may contain materials that are other than pumpable liquid, the intermediate layer liquid is filtered before it reaches the pump. It is known to use stationary screens for such filtering, as shown by the aforementioned and other U.S. Patents such as U.S. Pat. Nos. 5,635,064 and 5,492,635.

SUMMARY OF THE INVENTION

The present invention relates to a novel system and device for pumping effluent from a septic tank, including a rotary self-cleaning strainer for filtering non-liquid materials from the intermediate waste layer of a septic tank. The present invention utilizes certain principles of the commonly owned U.S. Pat. No. 5,215,656, the entire disclosure of which is incorporated herein by reference.

Several embodiments of the invention are disclosed, and each possesses certain unique features within the generic scope of the invention. The various embodiments possess various constructional and functional attributes endowing them with certain advantages. Certain tubes may be conventional PVC plastic which is readily available, and may be cut to desired lengths at an installation site. The strainers use materials that are suited to provide long service life. Should service be needed, the system, and various parts may be conveniently removed and/or disassembled.

A general aspect of the invention relates to a system for pumping effluent from a septic tank comprising a tube having an open end adapted to be disposed upright within a septic tank so that effluent can enter the tube. A strainer strains effluent entering the tube, and includes a cylindrical filter screen disposed coaxial with the tube to separate a cylindrical interior of the strainer circumscribed by the filter screen from an exterior surrounding the interior and constrain flow of effluent through the strainer to pass radially through the filter screen. An electric pump unit is disposed coaxially within the tube and comprises an inlet port which, along the direction of effluent flow through the system, is disposed downstream of the strainer and through which effluent enters the pump unit, and an outlet port at which effluent pumped by the pump unit exits the pump unit. An outlet pipe is communicated to the pump unit outlet port and conveys effluent pumped by the pump unit is conveyed out of the septic tank. A nozzle communicated to the pump unit outlet port is arranged to emit effluent pumped by the pump unit in a direction toward the cylindrical filter screen opposite the effluent flow through the filter screen so as to cause the filter screen to be acted upon by both radial and circumferential flow components. A journal mounts one of the screen and the nozzle for rotation relative to the other such that effluent emitted from the nozzle is effective both to turn the screen and nozzle relative to each other and to dislodge debris from the filter screen.

In certain embodiments the journal journals the screen for turning, and the nozzle is stationary while in others, the nozzle is journaled for turning and the screen is stationary.

In some embodiments, the nozzle is disposed within the interior of the strainer and arranged to emit effluent in a radially outward direction, and the flow of effluent through the filter screen is radially inward toward the interior of the strainer. In others, the nozzle is disposed in the exterior of the strainer and arranged to direct effluent radially inward toward the interior of the strainer, and the flow of effluent through the filter screen is radially outward toward the exterior of the strainer.

The foregoing features, advantages, and benefits of the invention, along with additional ones, will be seen in the ensuing description and claims which are accompanied by drawings. The drawings disclose a presently preferred embodiment of the invention according to the best mode contemplated at this time for carrying out the invention.

DETAILED DESCRIPTION

Figure 13:
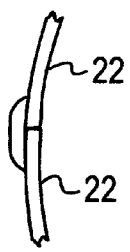
FIG. 13 is a modified form of FIG. 12.
Figure 12:
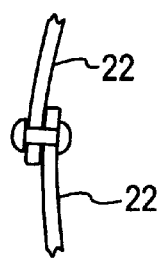
FIG. 12 is a view along line 12—12 in FIG. 9.
Figure 8:
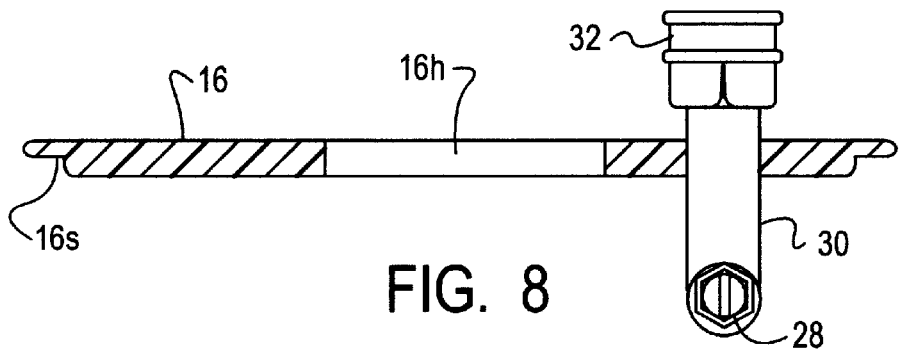
FIG. 8 is a fragmentary cross section view generally along line 8—8 in FIG. 7.
Figure 9:
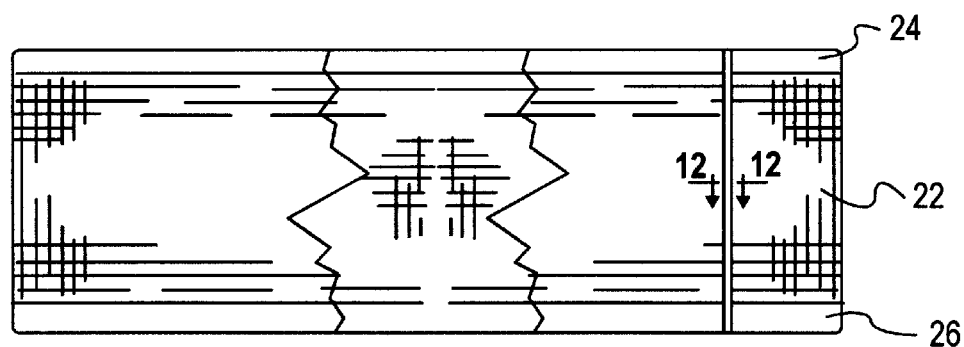
FIG. 9 is an elevation view of the screen.
Figure 10:
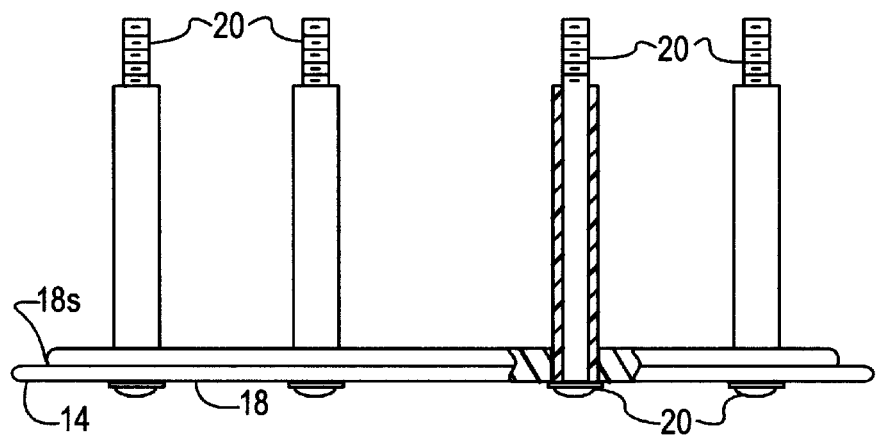
FIG. 10 is an elevation view of a portion of the strainer spool about which the screen rotates.

Strainer 10 is similar to that of U.S. Pat. No. 5,215,656 and has a main longitudinal axis 11 that is disposed generally vertical. The strainer comprises a screen 12 disposed around the circumference of a spool-like body 14 which has upper and lower annular members 16, 18 joined together by tie-rod structures 20. Screen 12 has a perforated sheet metal element 22 formed from a strip of desired width that is curled into a circle with opposite lengthwise ends overlapped and fastened together (FIG. 12) or abutted and fastened (FIG. 13). Strips 24, 26 of U-shaped channel are fitted onto the circular upper and lower edges of element 22. Screen can rotate on body 14 about axis 11, with strips 24, 26 having close running fits to shoulders 16s, 18s that extend around the outer margins of members 16, 18.

On the interior is a nozzle 28 aimed to direct liquid against the inside of element 22 for both imparting rotation to screen 12 and dislodging debris from the exterior of element 22. Nozzle 28 is part of a fitting 30 that mounts on member 16 and includes a threaded connection 32 to which a conduit is connected to deliver liquid under pressure to nozzle 28.

Figure 6:
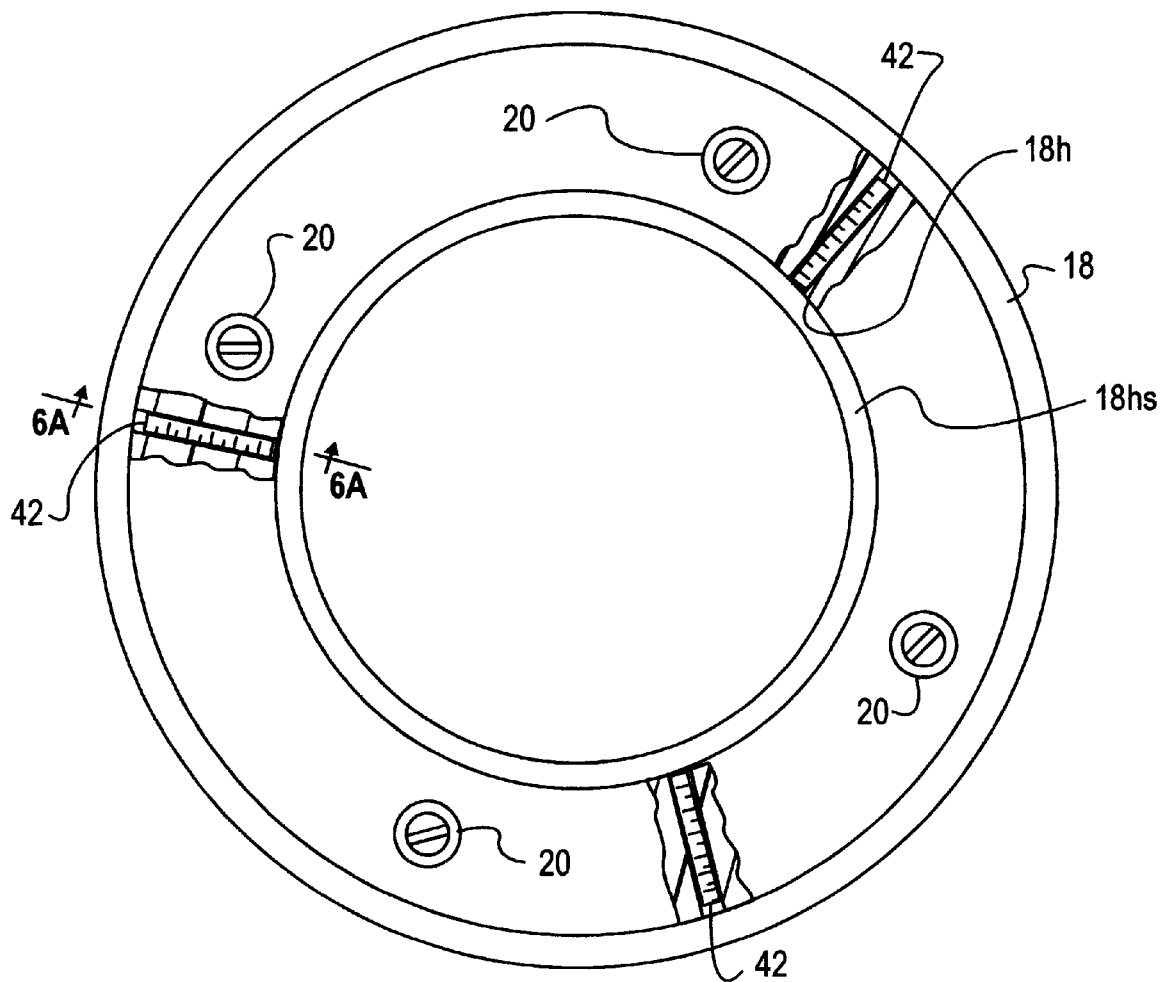
FIG. 6 is an end view generally in the direction of arrows 6—6 in FIG. 4 of the strainer by itself.

Holes 16h, 18h at the centers of members 16, 18 provide for strainer 10 to fit coaxially and closely onto the outside of a pump/motor sleeve 34 which is also coaxial with a support tube 36 of larger diameter. Both sleeve 34 and tube 36 can be commercial PVC pipe. Tube 36 is closed at the bottom. One way of closing the tube bottom is by a closure 39 that is fitted to the lower end of the tube in a fully sealed manner. With the closed tube disposed against bottom 38 of septic tank 40, strainer 10 is disposed at a desired elevation within tank 40 that places it within the elevational range of the intermediate liquid zone of septic tank waste. It can be seen in FIG. 6 that hole 18h has a shoulder 18hs to which the upper end of tube 36 fits, thereby properly positioning the strainer for seating on the upper end of the tube.

Sleeve 34 and tube 36 are associated by any suitable construction that keeps the lower end of the sleeve open. For example, screws 42 can be used to secure strainer 10 to sleeve 34, and several sets of bolts 44 to secure tube 36 to sleeve 34. Another set of bolts 46 can serve to define a ledge on which the lower end of sleeve 34 rests to thereby space that end a certain distance above closure 39, keeping the lower end of the sleeve open.

Figure 6A:
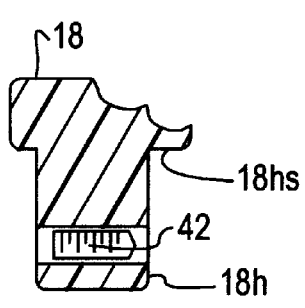
FIG. 6A is a fragmentary cross section view along line 6A—6A in FIG. 6.
Figure 6B:
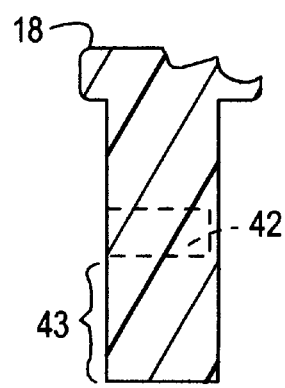
FIG. 6B is a modified form of FIG. 6A.
Figure 7:
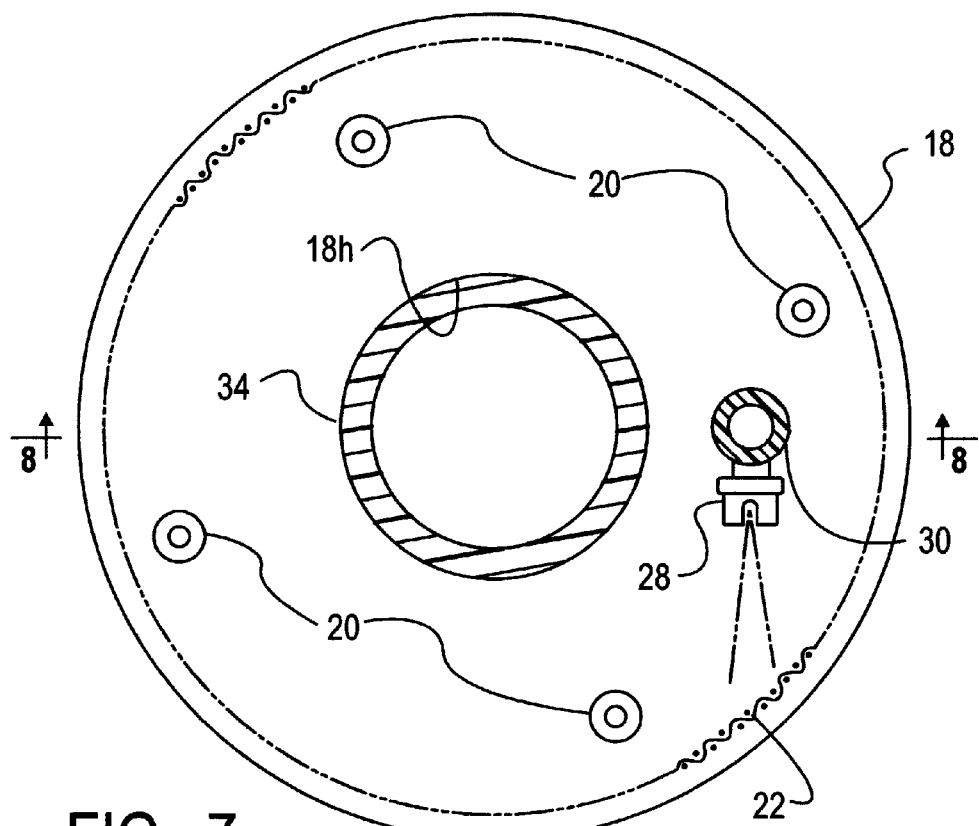
FIG. 7 is a view in the direction of arrows 7—7 in FIG. 4.
Figure 11:
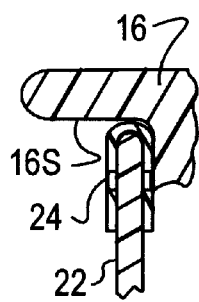
FIG. 11 is an enlarged view in circle 11 in FIG. 4.

Because of the close fits of members 16 and 18 to sleeve 34, no solid material of any significant size can intrude between the members and the sleeve. The close fit of member 18 to tube 36 precludes intrusion of solid material of any significant size between them. Hence, liquid from the intermediate zone is constrained to enter the top of support tube 36 essentially only through the perforated element 22, and in this way the liquid is filtered before it reaches the pump. If greater overlap is desired for even more intrusion resistance, an arrangement like FIG. 6B may be used where the length of a circular flange is increased when compared to FIG. 6A. Such a flange is shown as a part of member 18, but could be a separate part, such as a ring, or sleeve, attached to member 18. Member 18 may be fabricated as a single unitary part, or from several layers of sheet material that are cut to suitable shapes and laminated together.

An electric pump unit 48 comprising an electric motor 48m and a pump 48p driven by the motor is disposed coaxially within sleeve 34. When unit 48 operates, it draws liquid from the intermediate zone through strainer 10, thence downwardly through the annular space between sleeve 34 and tube 36, and thence around the lower edge of sleeve 34 where it enters the sleeve. The liquid then flows upward through the sleeve to enter the pump which will pump the liquid out as effluent through a conduit C extending from the pump outlet. As the liquid passes along the exterior of motor 48m, heat from the motor can transfer to the liquid whereby the liquid provides motor cooling. As the unit is being operated, liquid under pressure is being delivered to nozzle 28 by a supply pipe 50, causing screen 12 to be both rotated and cleaned. Because the pumped out effluent has been filtered by strainer 10, it may be used to supply nozzle 28 by teeing pipe 50 into conduit C.

Sleeve 34 extends upward to pass through a hole in the center of a top cover 52 that closes the open top of a cylindrical vault tube 54. The vault tube is supported in any suitable fashion, such as being suspended from the septic tank top wall in the manner shown. The vault tube extends downward from the top wall of the septic tank to a level below strainer 10, but above the lower end of tube 36. From where it tees into the conduit C, supply pipe 50 passes downward through another hole in cover 52. Conduit C extends upward through the inside of sleeve 34. At the upper end of sleeve 34, conduit C passes through a hole in a closure 57 that closes that end of the sleeve.

An annular disk 59 aids in centering sleeve 34, and hence strainer 10 and tube 36 as well, within the vault tube. The disk has suitable holes as required for allowing various parts to pass through it. It also provides a horizontal ledge for uprightly supporting a liquid level sensing assembly 58 within the vault tube. The particular level sensing assembly, which is shown as an example, comprises three float-operated switches, including one 58A for turning the pump unit on and off to regulate the waste level in the septic tank to a level that should keep strainer 10 in the intermediate zone of waste. It is believed that the radially surrounding presence of the vault tube to the strainer may be helpful in minimizing the ability of solid waste material to reach the outside of the screen element. It is spaced radially far enough away from the strainer however to avoid degrading the effectiveness of the nozzle in dislodging material from the exterior of the screen.

Figure 15:
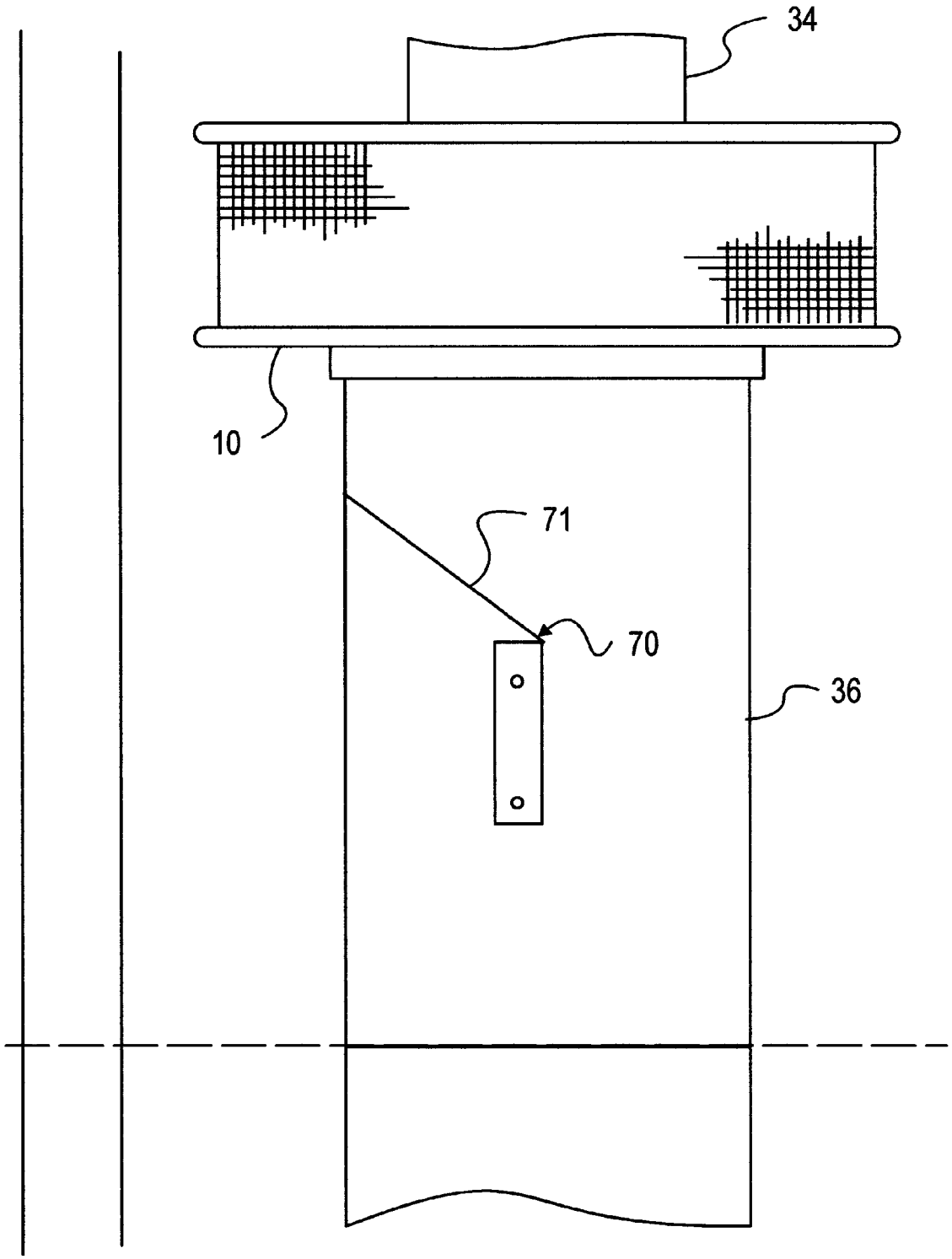
FIG. 15 is an enlarged view in the direction of arrows 15—15 in FIG. 1.

It is believed that a deflector element 70 (FIGS. 1 and 15) may be useful in re-directing a certain downward swirling of liquid that may occur when the strainer screen is rotated by the pressurized liquid being emitted by nozzle 28. The deflector may fasten to the outside of tube 36 below the strainer. It has an inclined deflecting surface 71 as shown. If the pressurized liquid emitted from the nozzle when the strainer screen rotates tends to cause a downward swirling flow of liquid, the deflector can aid in redirecting the flow upward.

Figure 14:
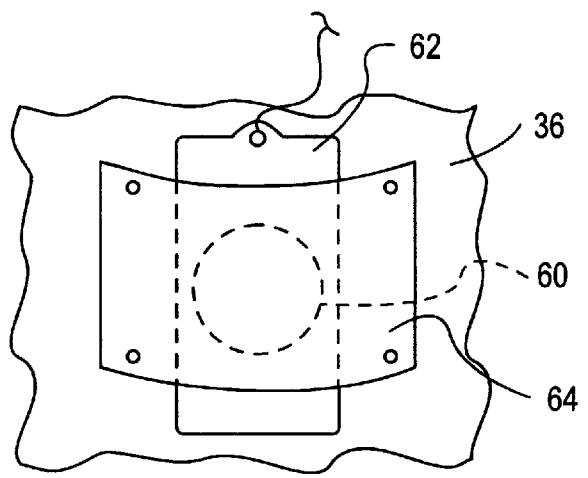
FIG. 14 is a fragmentary elevation view of an accessory item.
Figure 4:
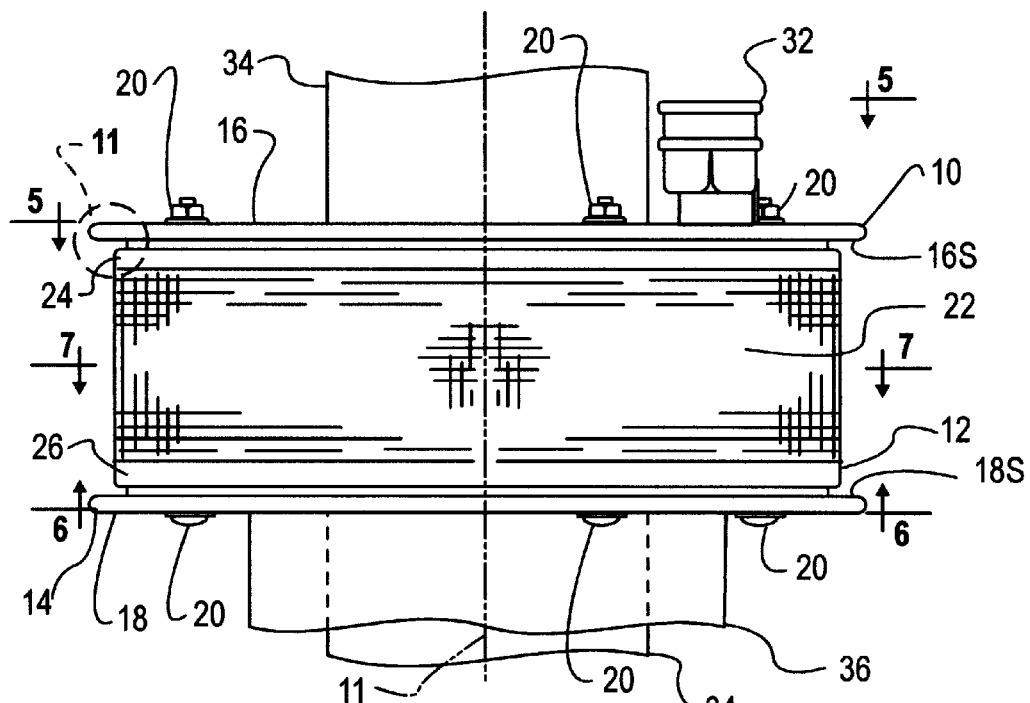
FIG. 4 is an enlarged fragmentary view of a portion of FIG. 1 that includes the rotary strainer.
Figure 5:
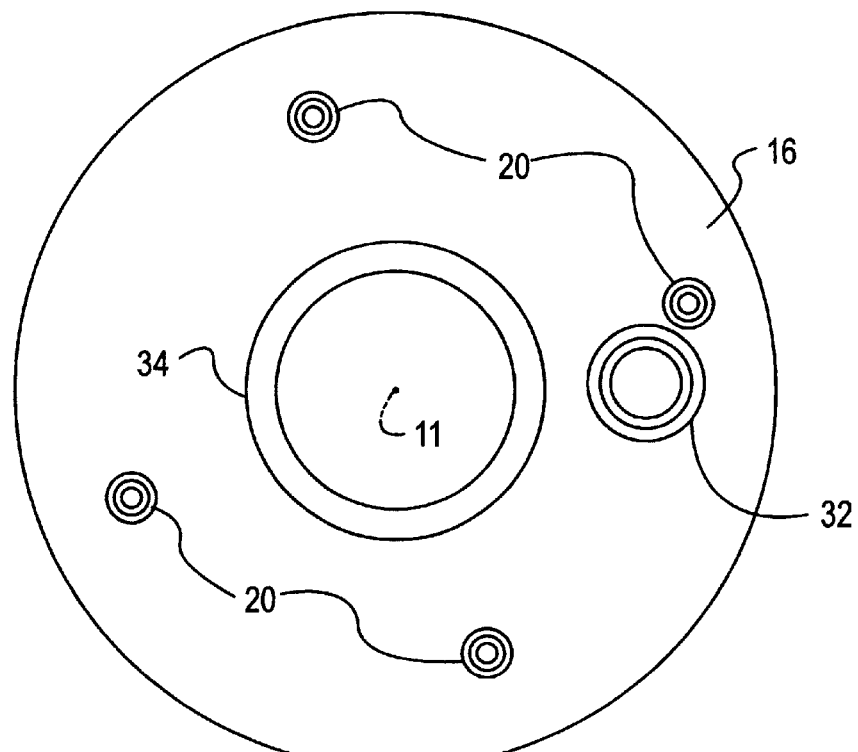
FIG. 5 is an end view in the direction of arrows 5—5 in FIG. 4 of the strainer by itself.

FIG. 14 shows an accessory, possibly optional, that may be useful when the assembly of components within the vault tube is removed from the septic tank by removing cover 52 and extracting the assembly through the open top of the vault tube. A hole 60 in the side wall of tube 36 is covered by a cover 62. The cover is held in place by an overlying band 64 fastened to the tube at either side of hole 60. A pull cord extends from the top of cover 62 to the top of the septic tank where it may be grasped and pulled upward to extract cover 62 from the band thereby uncovering hole 60. Cover 62 has sufficient thickness that the residual band 64 does not close hole 60. The open hole 60 therefore allows liquid to drain from tube 36 when the assembly is being removed.

Figure 1:
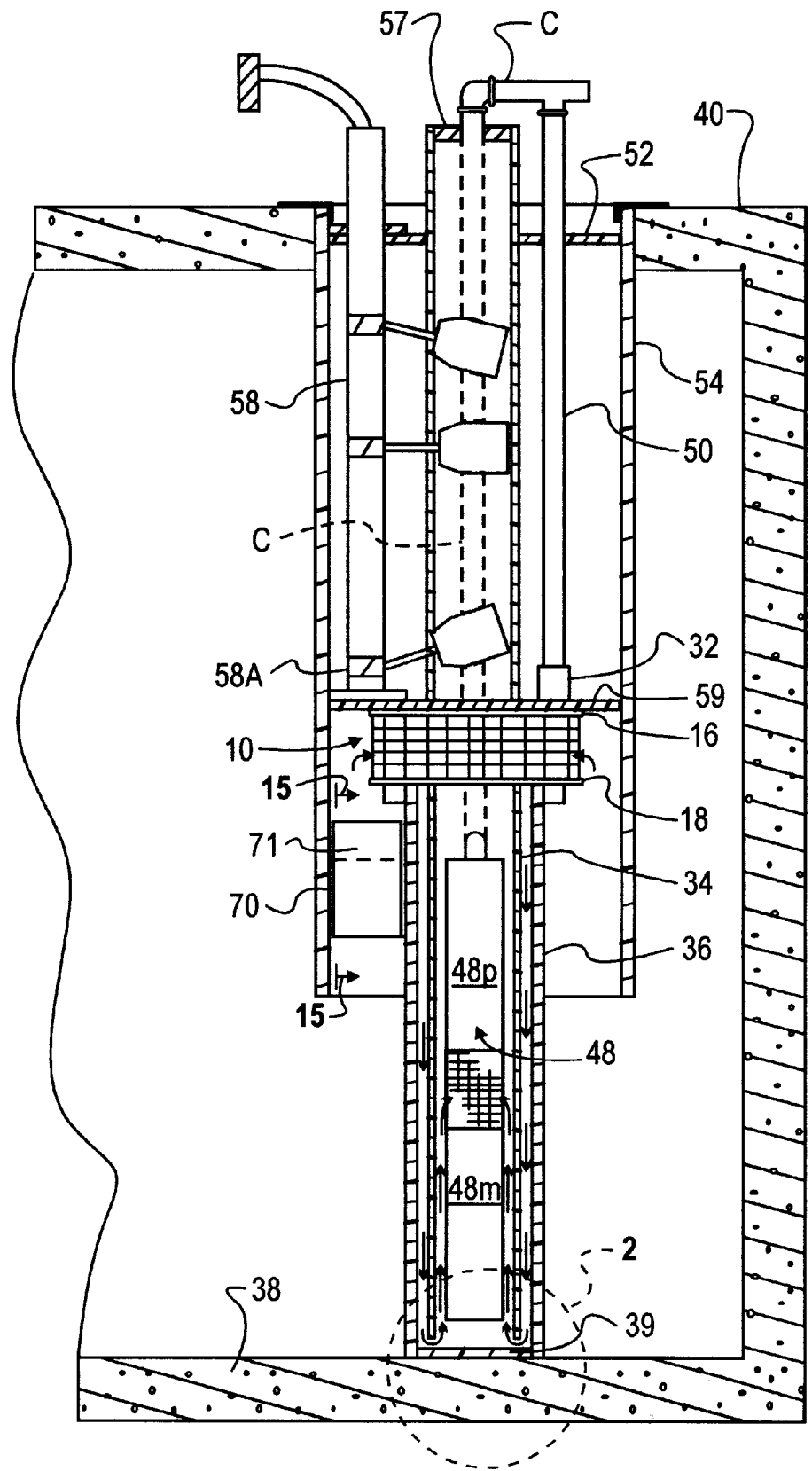
FIG. 1 shows an elevation view of the interior of a septic tank containing a first embodiment of an electric motor-operated pump and self-cleaning rotary strainer in accordance with principles of the present invention.
Figure 2:
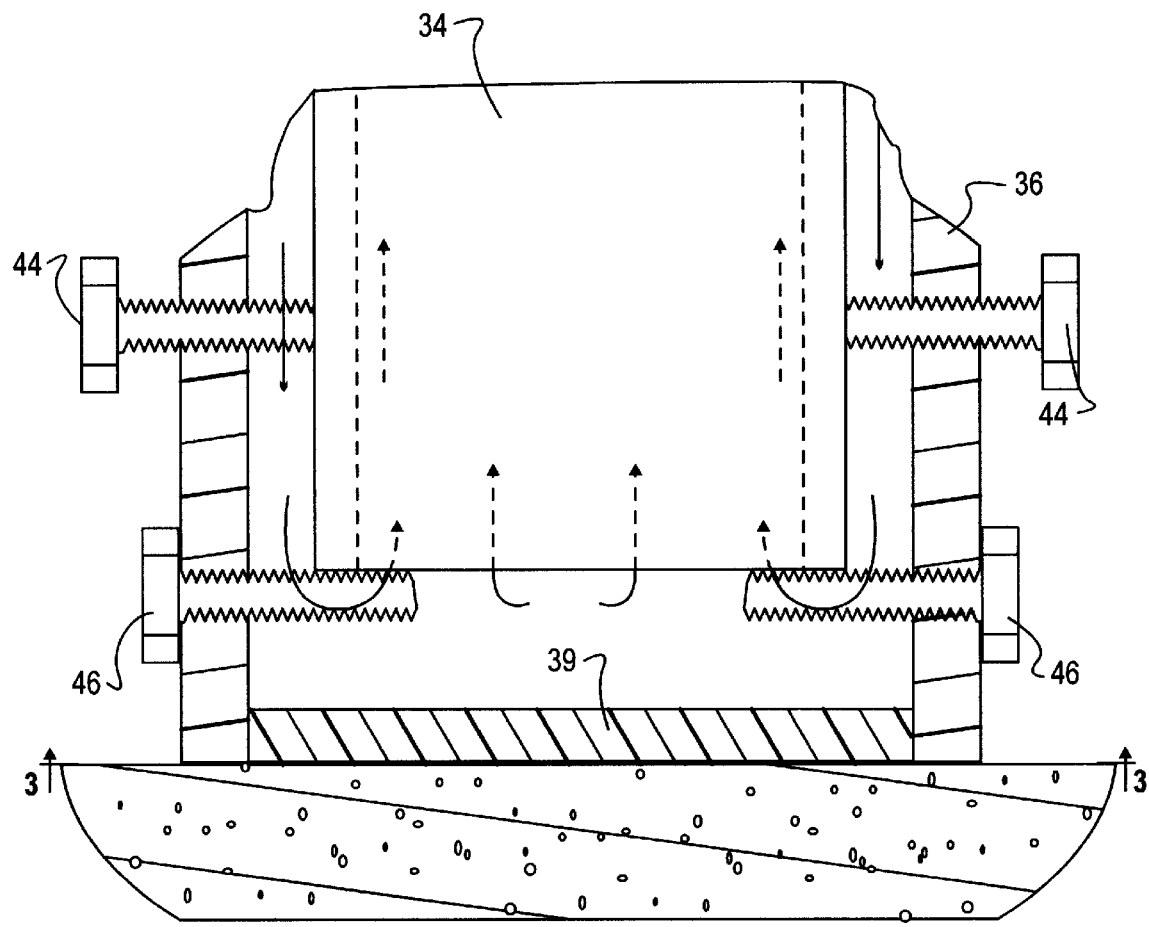
FIG. 2 is an enlarged fragmentary elevation view in circle 2 of FIG. 1.
Figure 3:
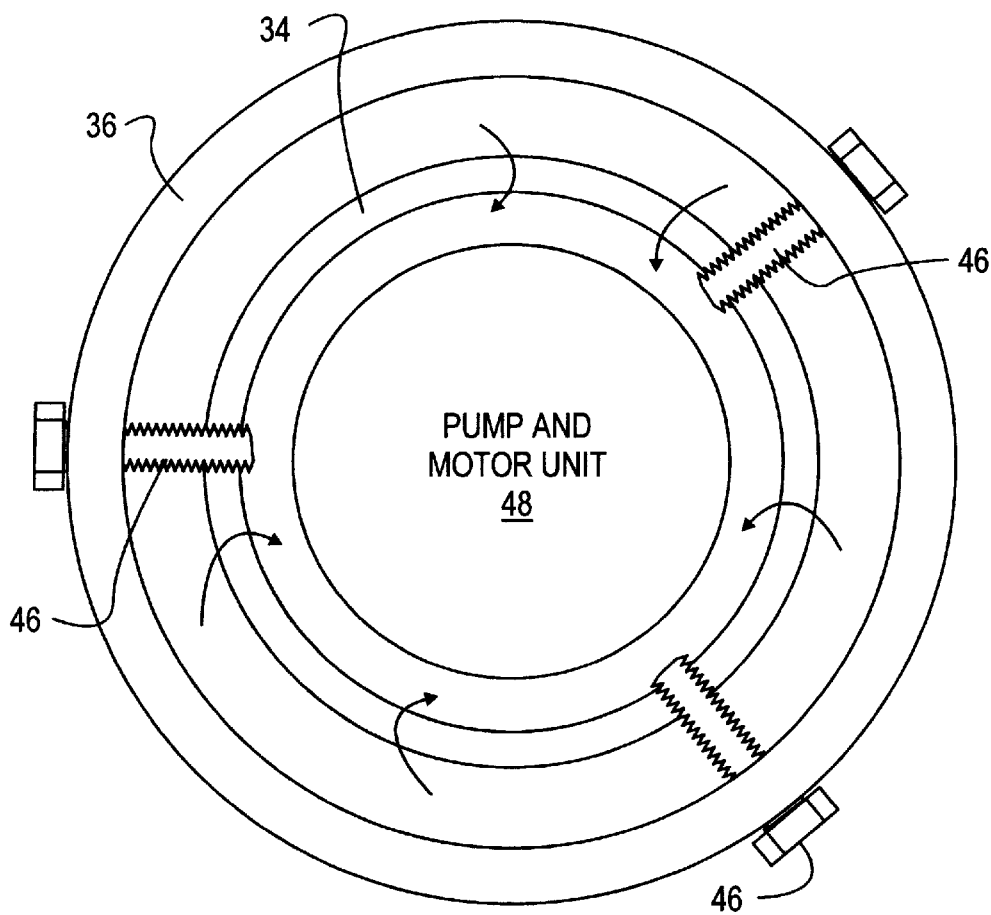
FIG. 3 is an end view in the direction of arrows 3—3 in FIG. 2.
Figure 16:
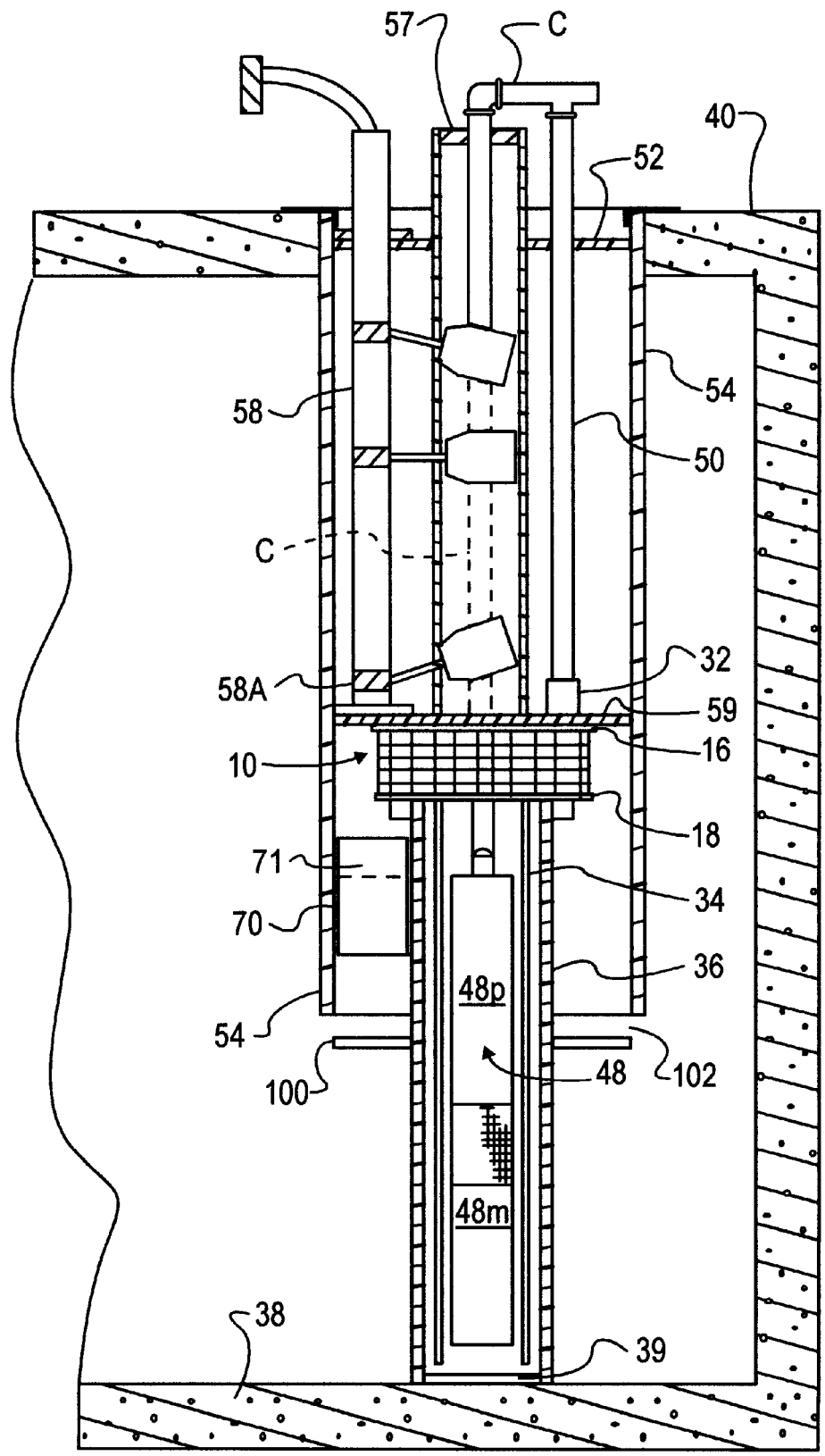
FIG. 16 shows an elevation view of the interior of a septic tank containing a second embodiment of an electric-motor-operated pump and self-cleaning rotary strainer in accordance with principles of the present invention.

FIG. 16 shows an elevation view of the interior of a septic tank containing an electric-motor-operated pump and self-cleaning rotary strainer in accordance with principles of the present invention, and it is like FIG. 1 of the incorporated provisional patent application except for the inclusion of a circular annular disk 100 around the outside of support tube 36 spaced slightly below the lower end of vault tube 54. The diameter of disk 100 is slightly less than that of the open area of vault tube 54. The inclusion of disk 100 creates an annular opening 102 through which fluid from the clear zone enters the interior of vault tube 54, and is intended to prevent large and possibly buoyant solids from perhaps floating directly upward into the interior of the vault tube. The reference numbers used in FIG. 16 designate the same parts as those identified by like reference numbers in FIGS. 1–15 of the incorporated application.

Figure 17:
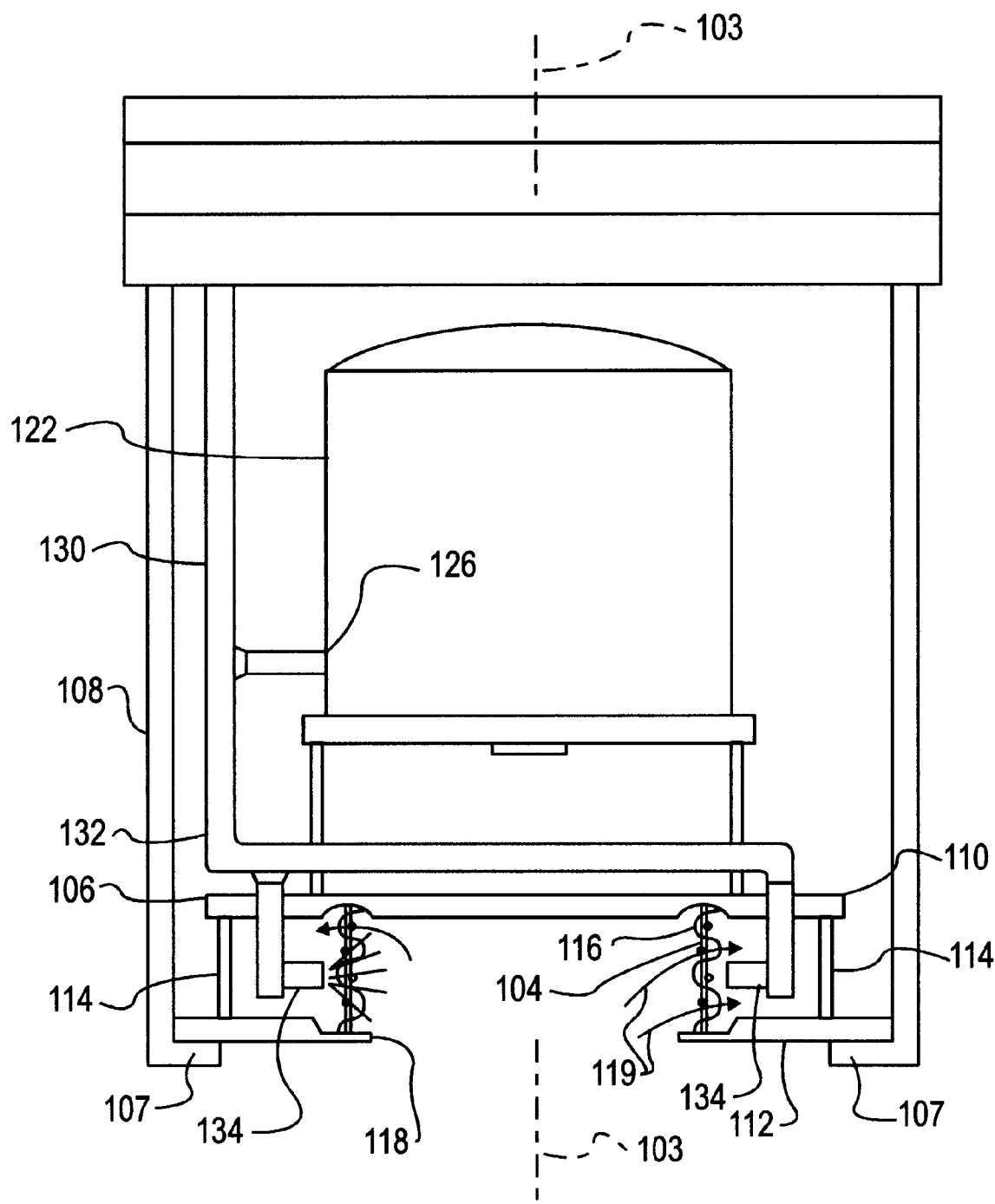
FIG. 17 shows an elevation view of the interior of a septic tank containing a third embodiment of an electric-motor-operated pump and self-cleaning rotary strainer in accordance with principles of the present invention.

FIG. 17 shows another embodiment that has a main longitudinal axis 103 that is disposed generally vertical. The strainer comprises a circular screen 104 disposed on a spool-like body 106 which is supported coaxial with axis 103 on a ledge 107 at the lower end of a vault tube 108. Body 106 has upper and lower members 110, 112 joined together by tie-rod structures 114. Screen 104 has a perforated sheet metal element 116 formed from a strip of desired width that is curled into a circle with opposite lengthwise ends over-lapped or abutted and fastened together. Strips of U-shaped channel are fitted onto the circular upper and lower edges of element 116. Screen 104 can rotate on body 106 about axis 103, with the U-shaped strips having close running fits to suitable formations in members 110, 112.

Member 112 has a circular hole 118 concentric with axis 103, and the interior of screen 104 is open to the clear zone of the vault through hole 118. Member 110 is closed in the region bounded by screen 104. Hence, the only path for liquid in the vault to enter the interior of vault tube 108 is through screen 104 in the manner suggested by the arrows 119.

A conventional electric-operated sewage effluent pump 122 is supported uprightly on, and spaced above, member 110. Liquid that has passed through screen 104 can be sucked into the pump through the pump inlet and discharged through the pump outlet 126. A portion of the pumped liquid is forced upward through a pipe 130 that carries it out of the vault. Another portion is returned via a branch pipe 132 to one or more nozzles 134 that emit the liquid so as to both rotate screen 104 and dislodge adhering debris from the exterior of the screen element. The drawing shows two nozzles 134 diametrically opposite each other. Each nozzle is aimed to direct liquid against the outside of the screen element for both imparting rotation to the screen and dislodging debris from the exterior of the screen element. The operation of the pump is controlled in a manner similar to that described in the incorporated application.

Figure 18:
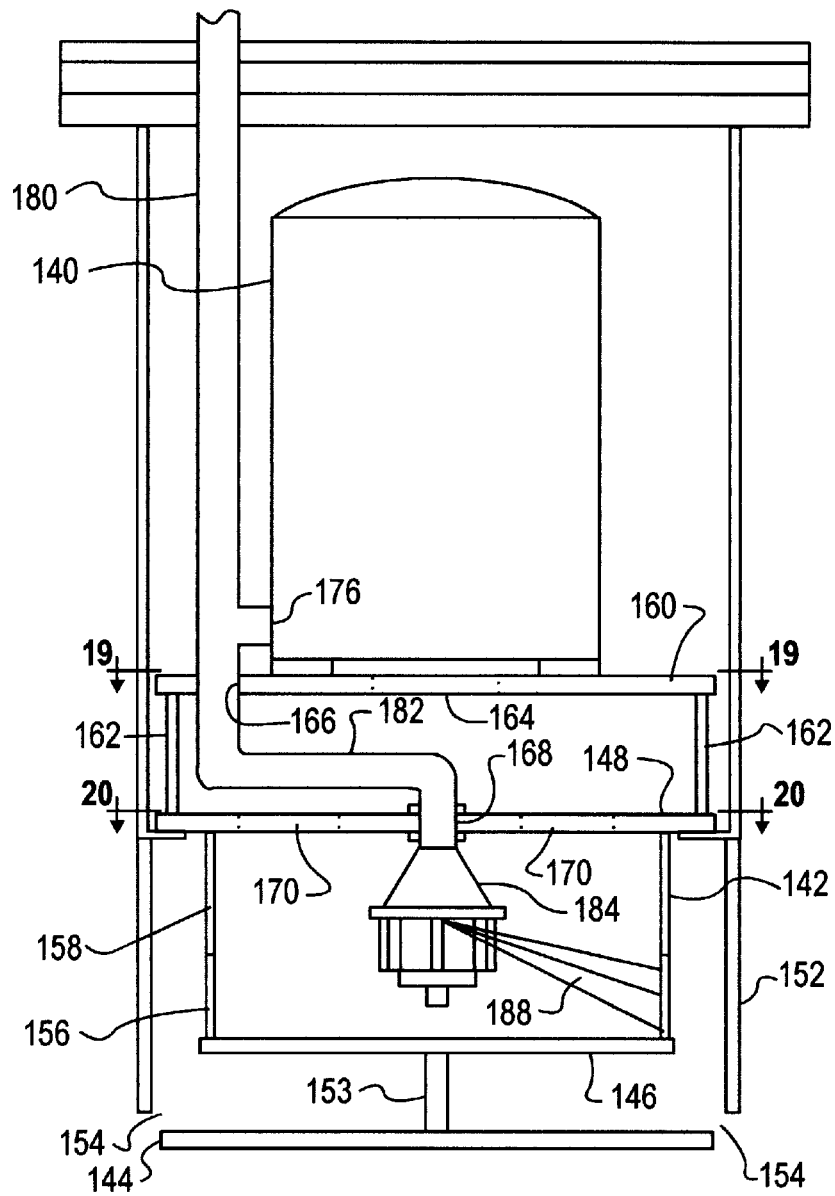
FIG. 18 shows an elevation view of the interior of a septic tank containing a fourth embodiment of an electric-motor-operated pump and self-cleaning rotary strainer in accordance with principles of the present invention.

FIG. 18 shows an elevation view of still another embodiment containing an electric-motor-operated sewage effluent pump 140 and a strainer 142. The strainer comprises a circular element captured axially between a lower circular disk 146 and an upper circular disk 148. Unlike the strainers of the previous embodiments, the element of strainer 142 does not rotate. Its upper and lower edges are sealed to disks 148, 146. A circular disk 144 is suspended from and below disk 146, such as by one or more posts 153, so as to be spaced slightly below the lower end of a circular tube 152 that forms a downward continuation of vault tube 54. The diameter of disk 144 is slightly less than that of the open area of tube 152. This arrangement creates an annular opening 154 through which fluid from the clear zone enters the interior of tube 152, and is intended to prevent large and possibly buoyant solids from perhaps floating directly upward into the interior.

Strainer 142 comprises an element that has a perforate zone 156 and a solid, or imperforate, zone 158.

Figure 19:
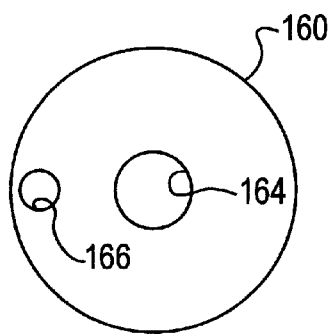
FIG. 19 is a view of one part of FIG. 18 by itself, as taken along line 19—19 in FIG. 18.
Figure 20:
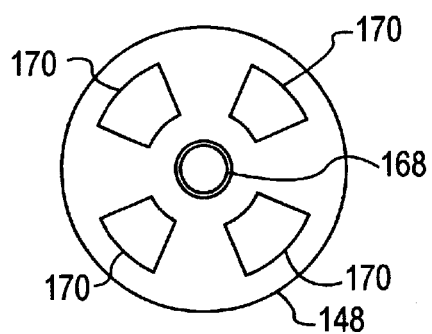
FIG. 20 is a view of another part of FIG. 18 by itself, as taken along line 20—20 in FIG. 18.

Pump 140 is supported uprightly on a disk 160 that is itself supported by posts 162 in spaced relation to disk 148. A plan view of disk 160 appears in FIG. 19. It shows a larger circular through-hole 164 passing centrally through the disk and a smaller through-hole 166 to one side. A plan view of disk 148 also appears in FIG. 20, and it shows a central circular through-hole 168 and a pattern of several other through-holes 170 arranged symmetrically about hole 168.

When the pump operates, liquid that has entered the interior of tube 152 through opening 154 and passed through perforated zone 156 of the strainer element continues on through holes 170 in disk 148 and hole 164 in disk 160 to enter the pump through the pump inlet. The liquid is discharged through the pump outlet 176. A portion of the pumped liquid is forced upward through a pipe 180 that carries it out of the vault. Another portion is returned via a branch pipe 182 to a sprayer 184 is disposed within the space bounded by the strainer element and disks 146, 146.

Sprayer 184 comprises a spray mechanism like that of U.S. Pat. No. 5,058,806, hereby incorporated by reference. That mechanism is effective to create a spray 188 that is directed outwardly against the inside of the perforated zone 156 and that rotates around the strainer to dislodge adhering debris from the outside of the strainer. Essentially the full axial extent of the perforated zone 156 is washed by the spray 188. Zone 158 is made imperforate because the sprayer imparts a direction to the spray that does not reach the upper portion of the strainer element. It is believed that a rotation speed within a range of 2 to 15 revolutions per minute is effective for the disclosed use in a vault. The disclosed sprayer 184 possesses a feature that enables such rotation rates to be obtained simply by suitable selection of viscosity of the dampening fluid. The specific constructional details for a strainer 142 embodying principles of the invention to achieve a spray characteristic suitable for cleaning the perforated area should take into account the pump outlet pressure so that both higher and lower pressure pumps may be used in various specific embodiments. The sprayer has a single channel from an outlet end of which the spray is emitted.

While FIG. 16 shows a representative use of the inventive strainer inside a vault tube in a vault, any of the inventive embodiments may be used in the same or other environments. For example an embodiment may be used in a secondary tank into which effluent from a primary tank (i.e. vault) is introduced before the fluid is ultimately disposed of.

While a presently preferred embodiment of the invention has been illustrated and described, it should be appreciated that principles of the invention are applicable to other embodiments within the scope of the following claims.

What is claimed is:

1. A system for pumping effluent from a septic tank comprising:
   a tube having an open end adapted to be disposed upright within a septic tank so that effluent can enter the tube;
   a strainer for straining effluent entering the tube, including a cylindrical filter screen disposed coaxial with the tube to separate a cylindrical interior of the strainer circumscribed by the filter screen from an exterior surrounding the interior and constrain flow of effluent through the strainer to pass radially through the filter screen;
   an electric pump unit disposed coaxially within the tube and comprising an inlet port which, along the direction of effluent flow through the system, is disposed downstream of the strainer and through which effluent enters the pump unit, and an outlet port at which effluent pumped by the pump unit exits the pump unit;
   an outlet pipe which is communicated to the pump unit outlet port and through which effluent pumped by the pump unit is conveyed out of the septic tank;
   a nozzle communicated to the pump unit outlet port and arranged to emit effluent pumped by the pump unit in a direction toward the cylindrical filter screen opposite the effluent flow through the filter screen so as to cause the filter screen to be acted upon by both radial and circumferential flow components of effluent emitted from the nozzle; and
   a journal mounting one of the screen and the nozzle for rotation relative to the other such that effluent emitted from the nozzle is effective both to turn the screen and nozzle relative to each other and to dislodge debris from the filter screen.

2. A system as set forth in claim 1 in which the journal journals the screen for turning, and the nozzle is stationary.

3. A system as set forth in claim 2 in which the nozzle is disposed within the interior of the strainer and arranged to direct the spray in a radially outward direction, and the direction of flow of effluent from the tube through the filter screen to the pump is radially inward toward the interior of the strainer.

4. A system as set forth in claim 3 in which the tube comprises a closed end opposite the open end, and the open end is disposed vertically above the closed end.

5. A system as set forth in claim 4 in which the pump unit is disposed coaxially within a sleeve that is itself disposed coaxially within the tube, and after entering the interior of the strainer, effluent flows downward through a space between the sleeve and the tube and thereafter enters the sleeve.

6. A system as set forth in claim 5 in which the sleeve comprises a lower end that is spaced above the closed end of the tube to provide for effluent that has flowed downward through the space between the sleeve and the tube to make a reverse turn as it enters the sleeve and then flow upward through the sleeve to the inlet port of the pump unit.

7. A system as set forth in claim 6 in which the sleeve passes completely through a central region of the strainer.

8. A system as set forth in claim 7 in which the strainer comprises upper and lower disks having outer perimeters axially capturing the screen on the strainer and inner perimeters circumscribing the sleeve.

9. A system as set forth in claim 8 in which the outer perimeters of the disks are shaped to provide the journal for journaling of the screen.

10. A system as set forth in claim 1 in which the pump unit is disposed vertically below the strainer.

11. A system as set forth in claim 2 in which the nozzle is disposed in the exterior of the strainer and arranged to direct effluent radially inward toward the interior of the strainer, and the direction of flow of effluent through the filter screen to the pump is radially outward toward the exterior of the strainer.

12. A system as set forth in claim 11 in which the pump unit is disposed vertically above the strainer.

13. A system as set forth in claim 1 in which the journal journals the nozzle for turning, and the screen is stationary.

14. A system as set forth in claim 13 in which the nozzle is disposed within the interior of the strainer and arranged to direct the effluent emitted from the nozzle radially outward toward the exterior of the strainer, and the direction flow of effluent flow from the tube through the filter screen toward the pump is radially inward toward the interior of the strainer.

15. A system as set forth in claim 14 in which the nozzle comprises a single channel from an outlet end of which the effluent is emitted.

16. A system as set forth in claim 15 in which the journal comprises a chamber containing a viscous damping fluid that damps the turning speed of the nozzle.

17. A system as set forth in claim 13 in which the journal comprises a chamber containing a viscous damping fluid that damps the turning speed of the nozzle.

18. A system as set forth in claim 1 in which an upper portion of the tube that contains the open end of the tube and the strainer are disposed within a lower portion of a further tube that has an open lower end, the two tubes have different diameters to provide a space between them that is open to effluent so that effluent can enter the space, and including a deflector disposed in the space below the strainer.

19. A system as set forth in claim 18 including a disk disposed to restrict entrance of effluent into the space.

* * * * *